Patented Feb. 10, 1953

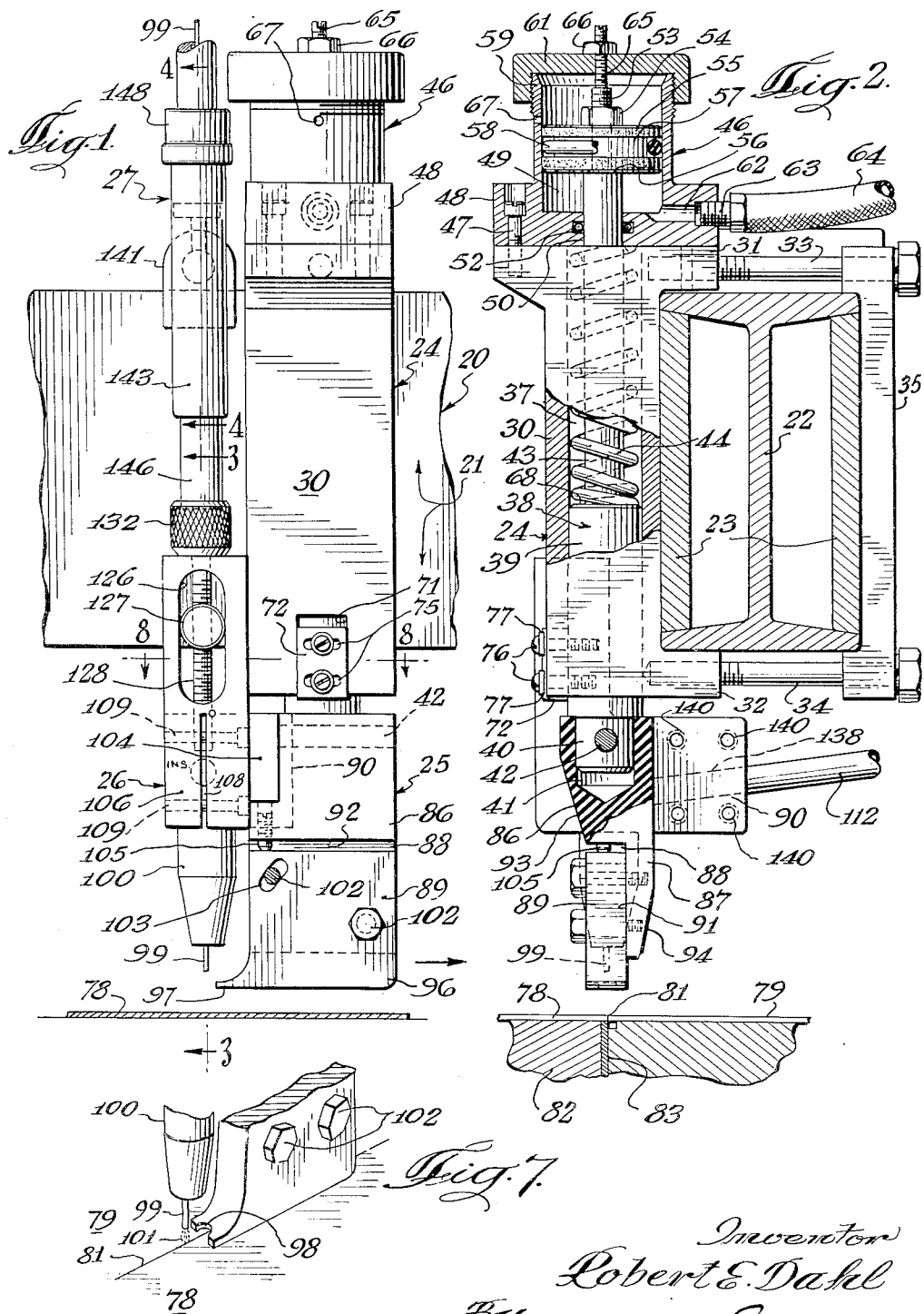

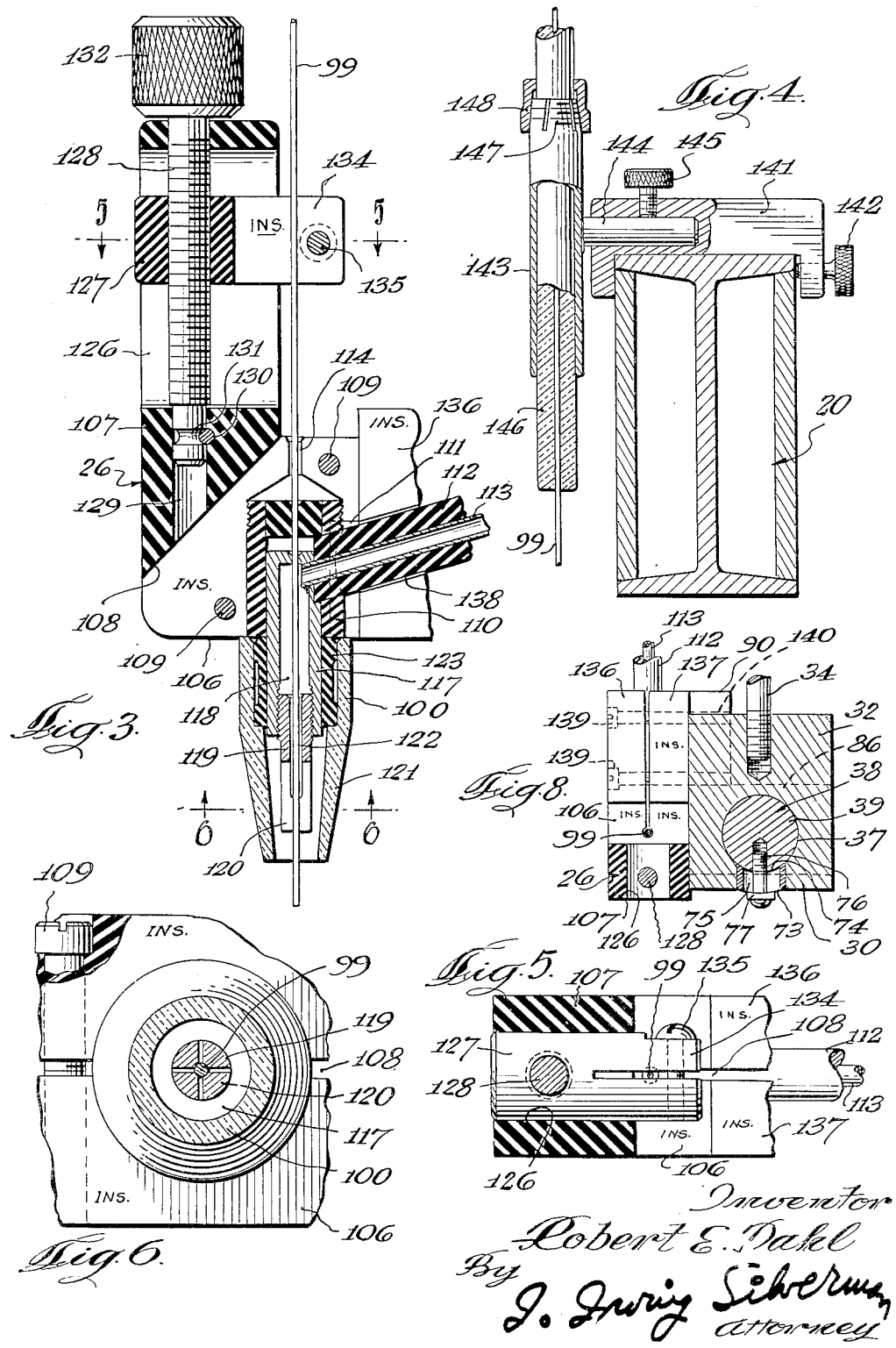

2,628,301

UNITED STATES PATENT OFFICE 2,628,301

WELDING HEAD

Robert E. Dahl, Hinsdale, Ill., assignor of one-half to Advance Transformer Co., Chicago, Ill., a corporation of Illinois Application March 8, 1951, Serial No. 214,544

11 Claims. (Cl. 219—8)

This invention relates generally to welding heads and more particularly is concerned with a welding head of the type for use in connection with automatic inert gas-shielded arc welding.

The great advantages of inert gas-shielded arc welding are well known and require no lengthy exposition herein. It is sufficient to state that generally the process involves welding by use of a low voltage electrical arc between a substantially non-consumed electrode such as a tungsten wire and the workpiece. The arc serves to provide a pool of molten metal of the workpiece itself, and is totally enveloped in a protective cloak of inert gas, such as helium or argon or the like, whereby no flux is required, there is no oxidation, and the so-called hard to weld metals are susceptible to ready welding.

This invention especially has been adapted for the high speed welding of silicon steel sheets end to end to enable a long length to be fabricated for use in automatic punch presses. The welding head is not limited to such use as readily will become apparent from the description herein.

One of the principal objects of the invention is to provide a welding head of the character described for use in automatic high speed inert gas-shielded arc welding.

Still a further object of the invention is to provide a head of the character described which has means for translating the electrode relative to the nozzle so that the parts of the head may be positioned a fixed distance relative to the workpiece and the voltage adjusted by varying the height of the electrode above the workpiece. In connection with this object, the construction of the head is such that the operator of the device may change the position of the electrode while the head is in use, so that the proper adjustment can be made under operating conditions. It is therefore an ancillary object to enable such practice.

Other objects of the invention are concerned with means for raising and lowering the movable portion of the head, and include the provision of novel keying means for enabling the axial position of the movable portion to be varied, which keying means forms a guide for the axial movement of the movable part of the head and the provision of a simple and effective air-operated mechanism for moving same.

Still other objects of the invention are concerned with the construction of the shoe, including the provision of means for adjusting the position of the shoe; means for supporting the shoe; and the constructional details of the shoe whereby same is easy to construct and will operate efficiently to hold the workpiece during welding and while moving relative thereto.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a front elevational view of a welding head constructed in accordance with my invention and showing the same attached to a carriage of an automatic welding apparatus, for example.

Fig. 2 is a side view of the head taken from the right hand side of Fig. 1, but showing portions of the head in section.

Fig. 3 is a sectional view on an enlarged scale of a portion of the welding head of Fig. 1 taken along the line 3—3 thereof and in the indicated direction.

Fig. 4 is a sectional view generally on the same scale as Fig. 3 taken through the electrode retaining means along the line 4—4 of Fig. 1 and in the indicated direction.

Fig. 5 is a sectional view along the line 5—5 of Fig. 3 and in the indicated direction with portions being shown in section.

Fig. 6 is a sectional view through the nozzle along the line 6—6 of Fig. 3 and in the indicated direction.

Fig. 7 is a fragmentary perspective view of the foot showing the position of the same during operation of the device.

Fig. 8 is a sectional view taken along the line 8—8 of Fig. 1 and in the indicated direction.

Generally speaking the apparatus herein described is required to provide a plurality of functions all of which must be capable of being carried out simultaneously in order that the device efficiently discharge its intended purposes. The head is mounted upon a carriage which may or may not be movable in a direction parallel with the joint of the workpiece. In any event, it is required that the welding head and the joint of the workpiece move parallel and relative to one another. The head must have a portion movable in a vertical direction relative to the workpiece so that same may be lifted from the workpiece after welding, and may be brought against the workpiece to enable the welding process to proceed. Furthermore, the workpiece joint must be held immobile while the head is moving relative thereto. Other requirements with respect to the construction of the device are that the inert gas and the electrode must be arranged in proper relation relative to the head and the workpiece. All of the above requirements and functions are accomplished by my invention as will be set forth below.

There is depicted in the drawings a carriage 20 upon which my welding head is adapted to be mounted. In a machine which is intended for large scale operations there may be a plurality of such welding heads. I have designated the head generally by the reference character 21. Referring to the carriage 20, same is preferably of rectangular cross section, and may be formed for example of a structural I-beam 22 with a pair of plates 23 closing off the open sides thereof.

In order best to understand the overall picture of the invention, the head 21 as referred to herein, consists of a number of cooperating parts which will be given general reference characters. Thus, there is provided a fixed portion 24 which, as will be explained, is fixedly secured to the carriage 20; the movable portion 25 which is supported by the fixed portion and is intended to be moved up and down; the nozzle housing member 26 which is coupled to and hence is movable with the portion 25; and the electrode guide 27 which is secured to the carriage 20.

None of the electrical circuits involved are explained herein, nor are the gas circuits and equipment shown, since the invention principally is concerned with the head itself which is usable with many different types of welding systems using this general method.

Referring now to the fixed portion 24 of the head 21, same includes an elongate housing 30, generally rectangular in cross section, having upper and lower flanges 31 and 32 respectively, for receiving therein bolts 33 and 34 respectively which in turn clamp the housing 30 to the carriage 20 by means of a clamping member 35 engaging against the carriage 20 from the side opposite the housing 30. The housing 30 has a central cylindrical bore 37 extending throughout the length thereof for housing the piston rod 38. The piston rod 38 has a lower journal portion 39 which engages within the bore 37 in sliding fit, and extends out of the bottom of the housing 30 as best shown in Figs. 1 and 2. The lower end of the piston rod 38 has a reduced diameter portion 40 which engages within a recess 41 provided in the movable portion 25 of the head 21, being pinned in place by the dowel pin 42 so that the rod 38 can move the portion 25 up and down by reciprocation.

Above the journal portion, as best shown in Fig. 2, the rod 38 has a narrowed portion 43 about which is engaged a coil spring 44. The coil spring extends from the top of the journal portion 39 to the upper end of the housing 30 and is contained in the bore 37 in the space between the walls of the bore and the reduced diameter portion 43.

There is mounted upon the upper end of the housing 30 an air cylinder designated generally by the character 46 which is secured to the flange 31 by appropriate screws 47 passing through a rectangular flange 48 integrally formed with said cylinder. The flange 48 closes off the bottom of a thin-walled cylindrical chamber 49 formed in said air cylinder, except for an opening 50 within which is journalled the upper end of the reduced diameter portion 43 of the piston rod 38. A substantially air tight journaling engagement is provided by suitable packing in an undercut groove provided in the flange 47 as shown at 52 in Fig. 2. The free upper end of the piston rod 38 has a further reduced diameter portion 53 which is suitably tapped to receive a nut 54 to enable the piston 55 to be secured thereto upon the shoulder 56 formed on the upper end of the reduced diameter portion 43. The piston 55 has an annular groove 57 within which is disposed suitable packing 58 to provide a tight fit of said piston in the cylindrical chamber 49. The exterior surface of the upper end of the cylindrical chamber 49 is threaded at 59 and covered by means of a cap 61 screw threaded upon said threaded portion 59 to close off the upper end of the chamber 49.

It is intended that the piston reciprocate in moving the piston rod 38 and hence the movable portion 25 of the head up and down. The lower part of the chamber 49 has a port 62 opening to the rear side of the flange 48 within which is suitably threaded a union 63 by means of which an air hose 64 is secured to supply air pressure to the underside of the piston 55 whenever desired. The source of air pressure and the valve mechanism for accomplishing these functions are not shown. The stroke of the piston 55 is limited by a stop member in the form of a threaded rod 65 engaged in the center of the cap 61 and adapted to abut against the free end of the reduced diameter portion 53. A lock nut 66 is provided on the exterior of the cap 61. A bleeder opening 67 is provided to keep the upper portion of the chamber 49 at atmospheric pressure.

The operation of the mechanism for moving the movable portion of the head down into engagement with the workpiece is as follows: The spring 44 is biased to expand, and hence when there is no pressure applied to the bottom of the piston 55, the spring will bear downwardly against the shoulder 68 of the journal portion 39 of the piston rod 38 and push the movable portion 25 against the workpiece as far as it can go. This situation persists until and unless air pressure is applied through the hose 64 and the piston 55 is raised against the pressure of the spring 44, lifting the piston rod 38 and the movable portion of the head. The stroke of the piston rod 38 is limited by the stop member 65.

The front of the housing 30 has a vertical rectangular slot 71 on the bottom thereof as best shown in Figs. 1 and 8, and said slot functions as a guide way for a key 72 which is secured to the journal portion 39 of the piston rod 38. It should be noted that while the key 72 is rectangular in elevation as viewed in Fig. 1, a horizontal cross section as in Fig. 8 reveals that same has its front and rear surfaces arcuate as indicated at 73 and 74 respectively. The key 72 is provided with a pair of horizontally extended slots 75, and machine screws 76, suitably threaded into the portion 39 to hold the key firmly to said portion. The heads of the screws 76 engage upon washers 77 which have arcuate bottom surfaces to permit them snugly to engage the surface 73.

Since the movable portion 25 is mounted upon the piston rod 38, its axial disposition relative to the fixed portion 24 of the head 21 will be controlled by the position of the key 72. By loosening the screws 76, and moving the key 72 circumferentially of the journal portion 39, so that the screws 76 and slots 75 move horizontally one relative to the other, the axial position of the movable portion 25 may be adjusted to any desired attitude. Thereafter the screws may be tightened and the adjusted position made fast. During reciprocating movement of the piston rod 38, obviously the key 72 slides up and down in the slot 71.

Reference has been made to a workpiece herein. Principally this type of apparatus is used in joining two members together along a butted joint. In Fig. 2 I have shown members 78 and 79 which are sheets of metal, joined along a butt joint 81. Reference to workpiece will therefore signify any member or members upon which the apparatus is intended to operate. The members 78 and 79 are shown arranged upon a suitable work table 82 having a movable guage 83 the construction of which is not material to this description. The gauge properly positions the joint 81 so that it coincides with the path of movement of the head 21.

The movable portion 25 of the head 21 includes a shoe block 86 which is formed of metal, having an elongate narrow support flange 87 formed by reason of the recess 88 within which the shoe 89 is disposed. The upper portion of the block 86 is provided with the recess 41 as previously mentioned, and is somewhat L-shaped in cross section as shown by the broken lines in Fig. 8, by reason of a laterally extending rectangular portion 90 integrally formed with said block 86. As viewed in Fig. 1, the extension 90 may be considered as extending rearwardly. The recess 88 is rectangular and may be formed merely by milling out a corner of the block 86, so that there is a flat surface 91 which is the inner face of the extension 87, and an upper wall 92. It should be noted that the block 86 and the extension 87 are both tapered somewhat as at 93 and 94 respectively to decrease the bulk of the apparatus and to give maximum visibility of the arc and workpiece to the operator. Note that the block is suitably pierced to receive the dowel pin 42.

The shoe 89 is a generally rectangular member of metal, preferably, which, when mounted in the recess 88 extends a small distance below the furthest extent of the extension 87. The bottom edge of the shoe is intended to engage the workpiece rather firmly while moving relative thereto in the direction indicated by the arrow in Fig. 1. Thus the leading edge is rounded as shown at 96 while the trailing edge has a tapered toe extension 97 so that the workpiece will be engaged as close as possible to the arc. It is pointed out that the center of the shoe 89 is intended to pass along the joint 81. A small arcuate recess 98 may be formed so that the joint 81 may be seen as the welding is taking place.

The association of the shoe 89 with the workpiece is best shown in Fig. 7 which also shows the general location of the welding electrode 99, the nozzle 100, and the arc 101, all of which will shortly be described in detail. Note that all are aligned with the joint being welded.

The shoe is secured to the extension 87 with its face against the surface 91, but its top edge slightly spaced below the top wall 92 of the recess 88. Bolts 102 pass through openings in the shoe 89 and engage screw threaded holes provided therefor in the extension 87. The upper left one of the shoe openings as shown at 103 in Fig. 1 is arcuate about the center of the opposite bolt so that the toe end of the shoe may be adjusted to various tilted positions as desired. A rectangular recess 104 in the block 86 gives access to an adjustable stop screw 105 which passes downwardly through the block 86 and into the space 88, engaging against the upper edge of the shoe 89. This screw is to assure that the set position of tilt of the shoe will not be varied by the force of the shoe coming down upon the workpiece.

Referring now to Fig. 3 especially, the nozzle housing 26 also serves as the electrode holder for my head. It consists of an L-shaped block of insulating material of good strength, such as a phenolic condensate known commercially as "Bakelite" having a horizontal portion 106 and a vertical portion 107. The horizontal portion 106 is split as shown at 108 so that same may serve as a clamp, and for this purpose is provided with suitable clamping bolts 109 passing through one-half of the clamping portion 106 and being suitably threaded into the other half. The portion 106 is drilled and tapped to receive therein a bushing 110 which is formed of insulating material, and the end of the portion 106 is milled to form a slot 111 to permit entry into the bushing 110 of a large tube 112. The tube 112 is of relatively stiff insulating material such as hard rubber and has a central metal conduit 113 which acts both as the electrical lead to the electrode 99 and as the means for conducting the inert gas to the workpiece.

The bushing 110 is aligned with an aperture 114 by means of which the tungsten wire electrode 99 passes through the clamping portion 106 through the center of the bushing. The upper end of the bushing 110 is provided with a soft sealing plug 116 to prevent the efflux of gas from the top of the bushing. Within the bushing 110 there is engaged a copper tube 117 which has a hollow center 118. The conduit 113 is soldered or brazed to and makes electrical contact with the tube 117, which in turn contacts a collet 119 having a split end 120 for holding the electrode. The collet 119 is threaded into the bottom end of the tube 117. A ceramic nozzle 100 surrounds the lower end of the assembly just described and the electrode end extends out of the tapered end 121 of the nozzle 100. The nozzle hoods the electrode and surrounds the arc 101 with the inert gas. Note that the gas passes from the conduit 113 into the center 118 of the tube 117, through the center opening 122 of the collet 119 which is made of greater diameter than that of the electrode 99, and thence out through the slots of the split end 120. A silicone gasket 123 prevents gas leakage from upper end of nozzle.

It is not intended to be limited by the nozzle construction described above, nor is it intended that the construction is suitable for all requirements. This portion of the invention is not considered of importance per se since the arrangement of parts will depend upon those parts available commercially. Actually, the devices I have constructed were made by re-working commercial assemblies or by using parts obtained from commercial manufacturers of torches.

Directing attention now to the upper portion 107 of the member 26, note that same is somewhat elongate and has a large slot 126 formed therein. An electrode clamp member 127 is arranged for vertical movement in the slot, and for this purpose, the slot has a feed screw 128 journalled in the member 107 with its lower end in a passage 129 and fixed against axial movement by a pin 130 engaging in a groove 131 on the feed screw end. The upper end of the screw 128 extends through the top of the portion 107 and has a large knurled knob 132 thereon to enable the screw to be turned. The right hand end of the clamp member 127 is split as 134 and the split halves are clamped together upon the electrode 99 by the screw 135. Obviously, turning the knob 132 will raise or lower the clamping member 127 which in turn will withdraw or extend the electrode 99 relative to the nozzle end 121.

Returning now to the portion 106, it will be seen that the tube 112 is clamped firmly to the member 26. I provide a split rectangular block of insulating material formed of halves 136 and 137, grooved as at 138 to accommodate the tube 112, and clamped together by means of the screws 139 which pass through the block and into appropriately threaded openings 140 provided in the extension 90. This arrangement serves to couple member 26 to the block 86 and to support the same therefrom to move therewith.

I have thus far described my invention in all of its details with the exception of a refinement thereof which is used in case it is desired to have the electrode 99 fairly long. This refinement is illustrated in Fig. 4 and consists of a C-clamp 141 mounted upon the carriage 20 by a suitable thumb screw 142 and having a vertical tubular member 143 secured to the C-clamp by means of a lateral rod 144 attached to the tube, inserted into an appropriate recess of the C-clamp and being held in place by a set screw 145. The tube has a central insulating bushing 146 which is pierced throughout its length to permit the electrode 99 to slide relative thereto. The tube 143 has a split chuck end 147 with a screw cap 148 to hold the bushing in place. Obviously this device serves to guide the electrode 99, and will be stationary relative to the fixed part 24 of the head 21, since both are fastened to the carriage 20.

It is believed that the welding head described herein has been sufficiently explained without necessitating further explanation thereof. The simplicity thereof and the ease with which same may be assembled, adjusted and operated enable the device ideally to be used in automatic high speed welding machinery. It is pointed out, for example, that the view shown in Fig. 1 is the appearance of the front of the device to the operator so that by watching the arc or a suitable meter he can determine the proper height of the electrode 99 above the workpiece and adjust the same while the device is operating and the workpiece and head 21 moving one relative to the other. This can be done merely by turning the knob 132.

The invention resides in many other features of the apparatus, but it is desired to point out that the preferred embodiment described is capable of wide variation as to the arrangement of parts, the sizes and shapes thereof, the substitution of equivalents and their disposition of one relative to the other, but all well within the purview and scope of the appended claims, and without in any way departing from the spirit of the invention.

What is desired to claim by Letters Patent of the United States is:

1. In a head for automatic inert gas-shielded arc welding which includes a portion adapted to be fixed to a carriage and another portion which is reciprocable relative to the fixed portion and which has means for engaging the workpiece, the herein invention which comprises a support member adapted to be secured to and movable with the reciprocable portion and having a nozzle attached thereto for directing gas to the workpiece, means for leading gas to the nozzle, an electrode having an exposed portion and a portion extending into the said support member and down the center of the nozzle, said electrode adapted to be connected to a source of electrical power, and means for moving said electrode axially of the nozzle irrespective of whether said head is being used and without disassembling any part thereof, which comprises a clamping member engaged with the exposed portion of said electrode, a track provided on said support member and arranged parallel with the axis of said electrode and along which said clamping member is confined to move, and manual means insulated from said electrode for moving said clamping member to any desired position.

2. In a head for automatic inert gas-shielded arc welding which includes a portion adapted to be fixed to a carriage and another portion which is reciprocable relative to the fixed portion and which has means for engaging the workpiece, the herein invention which comprises a support member adapted to be secured to and movable with the reciprocable portion and having a nozzle attached thereto for directing gas to the workpiece, means for leading gas to the nozzle, an electrode having an exposed portion and a portion extending into the said support member and down the center of the nozzle, said electrode adapted to be connected to a source of electrical power, and means for moving said electrode axially of the nozzle irrespective of whether said head is being used and without disassembling any part thereof, which comprises a clamping member engaged with the exposed portion of said electrode, a track provided on said support member and arranged parallel with the axis of said electrode and along which said clamping member is confined to move, and manual means insulated from said electrode for moving said clamping member to any desired position, comprising a rotatable screw journalled in said support member parallel with the said track and threadedly engaged with said clamping member.

3. In a device of the character described which includes a welding head having a work-engaging portion and portion adapted to be fixed relative to the work and have the work-engaging portion moved against the work and relative thereto, said work-engaging portion including a shoe adapted to be pressed against the workpiece and having a recess within which said shoe is mounted, means for mounting said shoe in said recess and being adjustable so that said shoe may be moved to various positions of tilt relative to the workpiece, and an adjustable stop member to prevent the movement of said shoe from any adjusted position by reason of pressure from the workpiece.

4. In a welding head for automatic inert gas-shielded arc welding which consists of a fixed portion adapted to be secured to a carriage movable relative to a workpiece and a movable portion adapted to be moved downwardly against the workpiece or raised from the workpiece, said movable portion comprising a shoe supporting portion having a workpiece engaging shoe adjustably secured thereto, a nozzle housing member secured to the said shoe supporting portion and having a gas tube of rigid construction having a central electrical conductor engaged with said nozzle housing member, a split block clamped to said tube, said housing member having a split portion also clamped to said tube, said block being secured to said shoe supporting portion whereby said tube serves as a coupling between the nozzle housing and the shoe supporting portion.

5. An assembly as described in claim 4 in which there is provided a downwardly directed nozzle on the nozzle housing and a metal gas conduit in the housing above the nozzle, the tube being laterally connected to the conduit, the nozzle adapted to lead gas to the workpiece, said nozzle housing member being formed of insulating material and having a wire electrode extending into the said housing member from the top thereof and thence extending into said conduit and having its working tip protruding from the nozzle, there being an electrical connection between the conduit and the electrode, said nozzle housing member having a slot arranged parallel with the nozzle axis and having a slidable chuck therein engaged with the electrode and means for adjusting the position of the chuck along the slot to position the electrode relative to the nozzle.

6. A welding head adapted to be used in high speed, automatic inert gas-shielded arc welding and which is adapted to be secured to a carriage for movement of the said carriage relative to the workpiece, which comprises, a portion adapted to be fixed relative to the workpiece and having a central vertical bore, a piston rod in the bore and spring biased to move downwardly, an air cylinder including a chamber and a piston movable in the chamber and having the piston rod connected therewith so that the introduction of air to the chamber will move the piston and the rod against the bias, the bottom of the rod having a cylindrical portion protruding from the bore and having a key thereon adjustable circumferentially thereof to a desired position of the rod circumferentially relative to the bore and serving to guide axial movement of the piston rod, a shoe support and shoe connected to said protruding portion and adapted to be engaged against the workpiece, and a nozzle housing member fixed relative to the shoe support and having a nozzle, and a gas tube feeding the nozzle, so that the nozzle moves with the shoe and has its position fixed relative thereto, there being an electrode passing through the center of the nozzle, and the nozzle housing member having means for adjusting the position of the electrode relative to said nozzle.

7. A welding head adapted to be used in high speed, automatic inert gas-shielded arc welding and which is adapted to be secured to a carriage for movement of the said carriage relative to the workpiece, which comprises, a portion adapted to be fixed relative to the workpiece and having a central vertical bore, a piston rod in the bore and spring biased to move downwardly, an air cylinder including a chamber and a piston movable in the chamber and having the piston rod connected therewith so that the introduction of air to the chamber will move the piston and the rod against the bias, the bottom of the rod having a cylindrical portion protruding from the bore and having a key thereon adjustable circumferentially thereof to a desired position of the rod circumferentially relative to the bore and serving to guide axial movement of the piston rod, a shoe support and shoe connected to said protruding portion and adapted to be engaged against the workpiece, and a nozzle housing member fixed relative to the shoe support and having a nozzle, and a gas tube feeding the nozzle, so that the nozzle moves with the shoe and has its position fixed relative thereto, there being an electrode passing through the center of the nozzle, and the nozzle housing member having means for adjusting the position of the electrode relative to said nozzle, comprising a screw guided chuck engaging the electrode and means for manually adjusting the position of the chuck, said means being insulated from said electrode.

8. A nozzle housing member for a welding head, comprising a substantially L-shaped member of insulating material, the horizontal portion of the L having a downwardly directed torch assembly therein comprising a metal gas conduit, a collet connected therewith, a nozzle having the collet extending down into the nozzle, and a central conductor gas tube connected laterally to the torch assembly and entering the L from the end of the horizontal leg thereof, said horizontal leg being split and clamped to said tube and torch assembly, an aperture in the horizontal leg and opening to the top thereof and aligned with the axis of the nozzle and adapted to have a wire electrode therein arranged coaxially with the nozzle and having an exposed portion parallel with the vertical leg of the L, said vertical leg having means clamped to said exposed portion adjustable along a line parallel with the electrode to adjust the position thereof relative to the nozzle.

9. A nozzle housing member for a welding head, comprising a substantially L-shaped member of insulating material, the horizontal portion of the L having a downwardly directed torch assembly therein comprising a metal gas conduit, a collet connected therewith, a nozzle having the collet extending down into the nozzle, and a central conductor gas tube connected laterally to the torch assembly and entering the L from the end of the horizontal leg thereof, said horizontal leg being split and clamped to said tube and torch assembly, an aperture in the horizontal leg and opening to the top thereof and aligned with the axis of the nozzle and adapted to have a wire electrode therein arranged coaxially with the nozzle and having an exposed portion parallel with the vertical leg of the L, said vertical leg having means clamped to said exposed portion adjustable along a line parallel with the electrode to adjust the position thereof relative to the nozzle, comprising a chuck engaged upon the electrode, a slot in the vertical leg and having the chuck therein, a screw feed member in the slot threadedly engaged with the chuck, and means for turning the screw feed member.

10. A head for automatic inert gas-shielded arc welding which is adapted to be secured to a carriage movable relative to a workpiece which comprises, a portion adapted to be fixed relative to said carriage and a portion reciprocable relative to the fixed portion, a slide member fixed to the reciprocable portion and cooperatively engaged in a slide way provided in said fixed portion, a nozzle holding member having means guiding an electrode through the nozzle and means for leading electric current and gas to the workpiece attached to and movable with the reciprocable member, said reciprocable member having a work engaging shoe, means for biasing said reciprocable member to move in a direction pressing the shoe against the workpiece and means associated with said fixed portion for overcoming the bias to raise the shoe from the workpiece when desired, said slide member consisting of a cylindrical rod moving in a cylindrical bore provided in said fixed portion, and a guide slot in the fixed portion and a key secured to the said cylindrical rod and movable in the guide portion to prevent rotation of the said cylindrical rod during reciprocal movements of the reciprocable portion relative to the fixed portion.

11. A head for automatic inert gas-shielded arc welding which is adapted to be secured to a carriage movable relative to a workpiece which comprises, a portion adapted to be fixed relative to said carriage and a portion reciprocable relative to the fixed portion, a slide member fixed to the reciprocable portion and cooperatively engaged in a slide way provided in said fixed portion, a nozzle holding member having means guiding an electrode through the nozzle and means for leading electric current and gas to the workpiece attached to and movable with the reciprocable member, said reciprocable member having a work engaging shoe, means for biasing said reciprocable member to move in a direction pressing the shoe against the workpiece and means associated with said fixed portion for overcoming the bias to raise the shoe from the workpiece when desired, said slide member consisting of a cylindrical rod moving in a cylindrical bore provided in said fixed portion, and a guide slot in the fixed portion and a key secured to the said cylindrical rod and movable in the guide portion to prevent rotation of the said cylindrical rod during reciprocal movements of the reciprocable portion relative to the fixed portion, said key having means for adjusting the position thereof circumferentially relative to the cylindrical rod to enable adjustment of the circumferential attitude of the said shoe relative to the fixed portion of said head.

ROBERT E. DAHL.

REFERENCES CITED

The following references are of record in the file of this patent:

UNITED STATES PATENTS

| Number | Name | Date |
|---|---|---|
| 2,067,363 | Waeschle | Jan. 12, 1937 |
| 2,229,570 | Howard | Jan. 21, 1941 |
| 2,358,158 | Gibbert | Sept. 12, 1944 |
| 2,404,383 | Kornblutt | July 23, 1946 |
| 2,441,507 | Peters | May 11, 1948 |

FOREIGN PATENTS

| Number | Country | Date |
|---|---|---|
| 125,376 | Australia | Sept. 8, 1947 |
| 266,691 | Switzerland | Feb. 15, 1950 |
| 566,908 | Great Britain | Jan. 18, 1945 |